United States Patent Office 3,432,331
Patented Mar. 11, 1969

3,432,331
METHOD FOR SURFACE TREATMENT OF GLASS ARTICLES
John E. Braddy, Delmont, Pa., and Bradley E. Wiens, Toledo, Ohio, assignors to Owens-Illinois, Inc., a corporation of Ohio
No Drawing. Filed June 25, 1965, Ser. No. 467,129
U.S. Cl. 117—46                                4 Claims
Int. Cl. C23c 9/06; B44c 1/02

---

ABSTRACT OF THE DISCLOSURE

Spraying a hot glass surface which is at a temperature between about 900° F. and about 1200° F. with a mist in an oxygen-containing gas of a suspension of finely divided aluminum metal in a combustible organic fluid, the latter being spontaneously combustible with the oxygen content of the gas upon striking the hot glass surface to deposit a firmly adherent aluminum oxide coating on the glass surface which does not leave a visible deposit on the glass surface.

---

This invention relates to a method for treating the surface of glass articles to enhance their properties and characteristics. In a more specific aspect, the invention relates to a method for treating the surface of glass containers to improve their properties and characteristics.

Glass is generally thought of as being a highly chemically resistant material. It is, in fact, a material having relatively good chemical durability. However, it is well-known to those familiar with the technology of glass that glasses, such as silica-lime glasses, are subject to slow weathering by water and gradual leaching or surface dissolution by various materials, notably acidic or basic aqueous solutions. This behavior of glass has been noted particularly in large scale commercial operations. These observations have led to the conclusion that there is room for improvement on the weathering qualities of flat window glass and, in particular, there is room for improvement in the chemical durability of glass containers, particularly soda-lime-silica glass containers.

It is therefore an object of the invention to provide a method for treating the surface of glass articles to increase their chemical durability. A more specific object of the invention is to provide a process for treating the surface of glass containers to increase their chemical durability. Other objects, as well as aspects and advantages, of the invention will become apparent from the ensuing disclosure.

According to the invention, there is provided a process which comprises treating a glass article or surface while at a temperature above the strain temperature of the glass but below the deformation temperature, that is, below the minimum at which undesirable or excessive deformation of the article will occur during the treatment, with a burning mixture of finely-divided aluminum, a combustible organic fluid fuel, and an oxygen-containing gas, such as air, oxygen-enriched air, or oxygen. The strain point is the temperature at which the viscosity of the glass is $10^{14.5}$ poises. The temperature of the glass article or surface is most usually within the range from 900° to 1200° F. in the practice of the present invention.

We have found that the method of the invention is efficiently accomplished by spraying a suspension of the particulate metallic aluminum in the combustible organic fluid, either in the gaseous or liquid state, into contact with the hot glass surface in the presence of an oxygen-containing gas, such as air. When the fuel-air mixture is heated to its ignition point by the heat of the hot glass, by radiation and/or conduction, spontaneous ignition is effected. A very efficient method for accomplishing the spraying is to employ an air atomizing spray gun as shown in the examples hereinbelow. As will be readily apparent, when using atomizing devices such as a spray gun, a fine mist of the organic solvent fuel-particulate metallic aluminum suspension is produced.

It will be further evident from the description of the invention contained herein, particularly the examples, that the organic solvent fuels are spontaneously combustible in the presence of a gas having a sufficient oxygen content when the fuel-particulate metallic aluminum mist contacts the hot glass surface. Air is the gas most commonly present in carrying out the present invention. Moreover, as mentioned above, the fuel-air-metallic aluminum mist is heated by the temperature of the hot glass surface. Therefore, it will be manifest from the foregoing that the organic fuel is only spontaneously combustible with the oxygen content of said gas in the ratio of gas and solvent fuel being used and, further, upon the temperature of the mist being raised by the temperature of the hot glass surface to the spontaneous ignition temperature.

From the examples that follow hereinafter, it will be seen that the present invention is most conveniently carried out by spraying a mist of the organic fuel-particulate metallic aluminum mixture onto the glass surface which is at a temperature above the strain temperature and below the deformation temperature of the glass, where the glass surface is surrounded by air. Therefore, it will be appreciated that there is nothing narrowly critical concerning the oxygen:fuel, or air:fuel ratio. The surrounding air contains sufficient oxygen, i.e. about 21% by volume, so that the organic fuel is spontaneously combustible when striking the glass surface which is at the temperature defined above. As will be further apparent, the rate of organic fuel in gallons per hour, for example, will vary widely depending on the number of glass surfaces per unit of time, surface area of glass, speed of conveyor belt and the like. Representative values are illustrated in the examples.

The result of the process is that a highly adherent oxidized aluminum coating is formed on the glass surface without leaving a visible deposit. There is often left a residual but nonadherent residue of finely-divided unreacted aluminum and/or powdered alumina, and this residue is easily removed with a blast of air or other gas.

In the treatment of glass containers, it is usually desired that the interior only be treated, and the finely-divided aluminum suspended in the liquid fuel can be injected with an air-atomizing nozzle extending into the interior of the bottle or container. Alternatively, the finely-divided aluminum can be suspended in a gaseous organic fuel-air mixture which is injected through a nozzle into the container. In either case, spontaneous combustion is effected almost instantaneously and the interior of the bottle can then be blown out with a blast of air or other gas to remove any loose residual powder. It is preferred that this step of the process (removing loose powder) be accomplished before the final annealing step which is necessary to relieve stresses in the glass bottles, because on long contact the loose powder of aluminum or alumina will become partly adhered to the surface of the bottle and form an undesired visible coating.

In the treatment of glass articles such as flat glass, glass block, and the like, the articles can be enclosed in a chamber into which is introduced the oxygen-containing gas and the suspension of alumina in the fluid fuel. A blast of air or other gas will remove any loose unadhered powder.

The preferred particle size of the aluminum is below 300 microns, although somewhat larger size particles can be employed, but less efficiently.

The combustible organic solvent fuel for suspending the finely-divided aluminum can be any combustible fluid such as kerosene, glycerol, methanol, turpentine, ethanol, butane, ethane, or methane. Liquid fuels are, however, somewhat preferred; the suspension of aluminum in liquid is more easily controlled with respect to the concentration of aluminum in the fuel, as will be understood. However, gaseous fuel suspending agents are also applicable. Fuels usually employed contain only carbon and hydrogen or only carbon, hydrogen and oxygen.

The combustion of the fuel heats the aluminum to a highly reactive condition so that it is believed that it chemically reacts with the glass surface under the existing high temperature conditions. Whether or not aluminum metal reacts directly with the glass surface or the aluminum metal is first oxidized and then reacts with the glass surface is not definitely known. Also, it is possible that some solution or fusion effects contribute to the formation of the coating. Further, the partial pressure of aluminum vapor, though small, may provide aluminum vapor that actually diffuses into and/or reacts with the glass surface.

The ratio of aluminum to combustible fuel is not critical, but less than a 1:3 ratio is generally employed, usually less than 1:10.

The following examples illustrate the method of the invention but are not to be considered as limiting thereof.

EXAMPLE I 25 grams of finely-divided metallic aluminum having a particle size less than 100 microns were suspended in 500 ml. of kerosene. Using a De Vilbiss P–MBC air-atomizing spray gun with an extension nozzle, this suspension was sprayed into 8-ounce baby formula bottles immediately after they left the take-out tongs of a bottle machine. The bottles were in excess of 900° F. The suspension immediately spontaneously ignited and burned with a flame inside the bottle for less than 3 seconds. The bottles were then immediately blown out with a jet of air, using 20, 30, and 50 p.s.i.g. air in different bottles to remove excess aluminum or powdered aluminum oxide. Thereafter the bottles are annealed in the usual manner. None of the bottles contained any visible coating. A portion of the bottles were then tested for chemical durability by the ASTM Test B–W. Three of the bottles blown with air at 20 p.s.i.g., 3 bottles blown at 30 p.s.i.g., 6 which were blown at 50 p.s.i.g., and 4 untreated control bottles were tested. The results of the average of each group are shown in the following table.

Table 1

| Sample: | Ml. N/50 $H_2SO_4$/100 ml. |
|---|---|
| Untreated controls | 1.45 |
| Treated with aluminum suspension and blown with air at— | |
| 20 p.s.i.g. | 0.81 |
| 30 p.s.i.g. | 0.66 |
| 50 p.s.i.g. | 0.74 |

It will be seen from the foregoing table that the treated bottles were about twice as durable as the untreated controls.

EXAMPLE II

Example I was repeated but with 12 grams of aluminum powder suspended in 1 quart of methyl alcohol instead of kerosene. The results were similar and are given below for the 6 bottles tested in the ASTM Test B–W and 3 control bottles. Duration of the visible burning in this case was unmeasurable; in other words, less than a second.

Table 2

| Sample: | Ml. N/50 $H_2SO_4$/100 ml. solution |
|---|---|
| Untreated controls | 1.01 <br> 1.01 <br> 1.04 |
| Treated bottles | 0.56 <br> 0.54 <br> 0.52 <br> 0.57 <br> 0.49 <br> 0.48 |

The results of the process are surprising since it would be expected that relatively large aluminum particles of the order of 100 microns would leave a visible coating. Of course, reaction of aluminum vapors with the surface might explain the results, but it seems unlikely that the low concentration of aluminum vapor that could be present would account for formation of a durable coating in less than 1 second, as in Example II. The vapor pressure of aluminum at 650° C. is only about $10^{-6}$ mm. Hg and even at 800° C. is only about $10^{-4}$ mm. Hg.

In any case, the effect of the process is to produce a durable and invisible coating.

What is claimed is:

1. The method for improving the chemical durability of a glass surface without changing its appearance consisting essentially of spraying a hot glass surface with a mist in a reactive oxygen-containing gas of a suspension of finely divided aluminum metal in a combustible organic fluid, containing only carbon and hydrogen atoms or only carbon, hydrogen and oxygen atoms, said hot glass surface being at a temperature betwen about 900° F. and 1200° F. said organic fluid being spontaneously combustible with the oxygen content of said gas in the ratio of gas and organic fluid being used upon striking said hot glass surface but only spontaneously combustible upon the temperature of the mist being raised by the temperature of the glass to the spontaneous ignition temperature, whereby an adherent aluminum oxide coating is formed on the glass surface without leaving a visible deposit thereon.

2. A method for improving the chemical durability of glass surface without changing its appearance consisting essentially of spraying a hot glass surface with a mist in air of a suspension of finely divided aluminum metal in a combustible organic fluid containing only carbon and hydrogen atoms, or only carbon, hydrogen and oxygen atoms, said hot glass surface being at a temperature in the range of from about 900° F. to about 1200° F., said organic fluid being spontaneously combustible with the air in the ratio of air and organic fluid being used upon striking said hot glass surface but only spontaneously combustible upon the temperature of the mist being raised by the temperature of the glass to the spontaneous ignition temperature, whereby an adherent aluminum oxide coating is formed on the glass surface without leaving a visible deposit thereon.

3. A method for improving the chemical durability of a glass surface as defined in claim 2 wherein the finely divided metallic aluminum has a particle size of less than 100 microns and the organic fluid is kerosene.

4. A method for improving the chemical durability of a glass surface as defined in claim 2 wherein the finely divided metallic aluminum has a particle size of less than 100 microns and the organic fluid is methyl alcohol.

References Cited

UNITED STATES PATENTS

| | | | |
|---|---|---|---|
| 2,283,705 | 5/1942 | Stewart | 117—105.3 X |
| 2,614,944 | 10/1952 | Lytle | 117—124 |
| 2,831,780 | 4/1958 | Deyrup | 117—124 |
| 3,087,831 | 4/1963 | Browne | 117—54 |

ALFRED L. LEAVITT, *Primary Examiner.*

A. GOLIAN, *Assistant Examiner.*

U.S. Cl. X.R.

117—104, 105.5, 124